United States Patent [19]

Stroze et al.

[11] Patent Number: 4,983,141

[45] Date of Patent: Jan. 8, 1991

[54] CONSTANT VELOCITY JOINT FOR HYDRAULIC ACTUATOR IN AN AIRFRAME

[75] Inventors: Mark S. Stroze, Rockford; Kenneth C. Spurbeck, Stillman Valley, both of Ill.

[73] Assignee: Sundstrand Corporation, Rockford, Ill.

[21] Appl. No.: 324,469

[22] Filed: Mar. 16, 1989

[51] Int. Cl.$^5$ .............................................. F16D 3/08
[52] U.S. Cl. ........................................ 464/7; 464/50; 464/904
[58] Field of Search .............................. 464/7, 50, 904

[56] References Cited

U.S. PATENT DOCUMENTS

| | | | |
|---|---|---|---|
| 1,119,514 | 12/1914 | Jonsson | 464/50 |
| 1,166,401 | 12/1915 | Faltin | 464/50 |
| 1,896,133 | 2/1933 | Chilton | 464/50 |
| 2,585,148 | 2/1952 | McDermott | 464/7 X |
| 2,762,210 | 9/1956 | Redard | 464/50 |
| 2,787,895 | 4/1957 | Kitselman | 464/50 X |
| 2,811,025 | 10/1957 | Redard | 464/7 X |
| 3,103,799 | 9/1963 | Berna | 464/50 |
| 3,271,978 | 9/1966 | Berna | 464/50 |

FOREIGN PATENT DOCUMENTS

| | | | |
|---|---|---|---|
| 2339097 | 8/1977 | France | 464/50 |
| 2539192 | 7/1984 | France | 464/50 |
| 214968 | 3/1968 | U.S.S.R. | 464/50 |

Primary Examiner—Daniel P. Stodola
Attorney, Agent, or Firm—Antonelli, Terry, Stout & Kraus

[57] ABSTRACT

A constant velocity joint (10) rotationally connecting rotationally mounted first and second members (12 and 14) together each having an axis of rotation (16 and 18) in accordance with the invention and includes at least one axial bore (42) within the first shaft offset from and parallel to the axis of rotation of the first member, a plurality of axial channels (46) extending along each axial bore which are located in a peripheral wall (44) of each axial bore; at least one axial bore (42) within the second member offset from and parallel to the axis of rotation of the second member, a plurality of channels (46) extending along each axial bore which are located in a peripheral wall (44) of each axial bore of the second member; at least one pair of rods connected together by a joint (28) having at least one degree of rotational freedom, one of the rods of each pair of connected rods being disposed in an axial bore within the first member and another of the rods of each pair of connected rods being disposed in an axial bore within the second member; and a casing containing at least a portion of the first and second members and for containing a fluid lubricating medium which is disposed within the bores and the channels during roation of the members.

17 Claims, 2 Drawing Sheets

CONSTANT VELOCITY JOINT FOR HYDRAULIC ACTUATOR IN AN AIRFRAME

DESCRIPTION

1. Technical Field:

The present invention relates to constant velocity joints coupling rotationally mounted members together which have inclined axes of rotation. More particularly, the present invention relates to joints of the aforementioned type in which one member is connected to an hydraulic motor and the second member is connected to an actuator in an air frame.

2. Background Art

Hydraulic motors are conventionally used to power actuators in air frames. A conventional configuration of a hydraulic motor in an air frame has a fixed axis of rotation which is rotationally coupled to an output shaft having an axis of rotation which is inclined to the fixed axis of rotation of the hydraulic motor. A rotary joint is required to connect the cylinder block of the hydraulic motor to the output shaft.

In hydraulic motors found on high performance aircraft, it is necessary that the aforementioned joint be a constant velocity rotary joint which must perform at high frequency rates for millions of cycles without service. To date, constant velocity rotary joints used for coupling the cylinder block of the hydraulic motor to the output shaft with inclined axes of rotation have not performed to the aforementioned standard or have required a costly implementation to satisfy the aforementioned performance.

Various constant velocity mechanical coupling arrangements have been utilized to couple together a cylinder block of a hydraulic motor having an axis of rotation which is inclined with respect to an output shaft rotatively coupled to the cylinder block. A first arrangement is the utilization of universal joints which transmit rotary motion through four pin joints arranged in a cross pattern in a configuration similar to that utilized for automotive applications. The diametrical size of the individual joints is several magnitudes smaller than the cylinder block of the hydraulic motor. As a result of the reduced diameter of the universal joint, the pin-to-yoke clearance is the weak link in the mechanical coupling of the cylinder block to the output shaft. As tolerances and wear increase, the pin-to-yoke shock loading becomes more severe. Small aberrations in clearance (thousands of an inch) quickly cause failure of a joint of the aforementioned type utilized in a high performance aircraft actuator having a high rotational velocity. A second solution to coupling the cylinder block of the hydraulic motor to the output shaft is with beveled gear sets in which the individual gears are carried by the cylinder block and the output shaft respectively. The single point mesh of the aforementioned beveled gear sets must be precisely machined and located to prevent interference and to control backlash between the gear sets to an acceptable tolerance. Also, single point loading of the gear set results in a tipping moment applied to the cylinder block which requires additional support measures for the cylinder block. Control of the backlash requires matched pairs of machined gear sets which makes production of the gear sets and replacement costly.

Constant velocity joints are known which couple first and second shafts together having inclined axes of rotation which utilize one or more pairs of rotationally connected rods which are disposed within axial bores within ends of the first and second shafts with the bores being located in positions offset from the axes of rotation of the shafts. See U.S. Pat. Nos. 3,782,135, 3,995,449 and 4,368,049 and French Patent No. 2,339,097.

While the couplings disclosed in the aforementioned patents provide a constant velocity coupling between first and second shafts having inclined axes of rotation, they are not well suited for applications in which long service life is required in which the couplings are located in a closed casing containing hydraulic fluid. These patents do not disclose a mechanism for lubricating the bores within which the pairs of rotationally connected rods are disposed. Furthermore, location of the couplings of these patents inside of a case full of hydraulic fluid such as in the above described hydraulic actuators utilized in air frames would have several disadvantages. In the first place, no mechanism is provided for lubricating closed bores in the ends of the members in which the rods connecting together the shafts are disposed. Furthermore, where minimizing weight is desirable and eliminating leakage of the hydraulic fluid, the axial length of the member would be shortened and the bores receiving the rods would be closed. If the bores would be closed in the prior art designs substantial drag would be caused between the bores and the rods and harmful build-up of pressure in hydraulic fluid within the bore between the end of the rod and the end of the bore would occur. The rotary couplings disclosed in the aforementioned patents do not have any mechanism for relieving pressure and fluid induced drag within closed bores and lubricating rods disposed within closed bores. Finally, none of the coupling mechanisms disclosed in the aforementioned patents are disposed within a closed casing containing hydraulic fluid.

DISCLOSURE OF THE INVENTION

The present invention provides a low cost constant velocity coupling for connecting rotationally mounted members which may be shafts together which have inclined axes of rotation. The aforementioned coupling is particularly useful in actuators of air frames which are powered by hydraulic motors in which high power and torque is outputted by the hydraulic motor, high rotational velocities are outputted by the hydraulic motor and a long service without maintenance is required. Furthermore, the present invention may be utilized to couple first and second rotationally mounted members together which have inclined axes of rotation with a constant velocity joint Additionally, the present invention is particularly useful wherever first and second members having inclined axes of rotation are rotationally coupled together by a constant velocity joint in which the constant velocity joint is immersed in lubricating medium such as hydraulic fluid.

A constant velocity joint connecting rotationally mounted first and second members together each having an axis of rotation in accordance with the invention includes at least one axial bore within the first member offset from and parallel to the axis of rotation of the first member, plurality of axial channels extending along each axial bore of the first member which are located in a peripheral wall of each axial bore of the first member; at least one axial bore within the second member offset from and parallel to the axis of rotation of the second member, a plurality of channels extending along each axial bore of the second member which are located in a peripheral wall of each axial bore of the second member; at least one pair of rods connected together by a joint having at least one degree of rotational freedom, one of the rods of each pair of connected rods being disposed in an axial bore within the first member and another of the rods of each pair of connected rods being disposed in an axial bore within the second member; and a casing containing at least a portion of the first and second members and for continuing a fluid lubricating medium which is contained within the and the channels during rotation of the members. Each of the bores has an opening receiving a rod and an end opposed to the opening which closes the bore. The first member is connected to a hydraulic motor; the second member is connected to an actuator; and the casing contains the hydraulic motor, the first member, the rods, the bores, and each joint. The actuator may be disposed within an air frame. The axial channels of each of the bores of the members are preferably disposed at equally spaced intervals about the peripheral wall of the bores. The fluid lubricating medium is hydraulic fluid which may be utilized by the hydraulic motor. Each joint may have only a single degree of rotation freedom. The hydraulic fluid contained within the bores and the channels is leakage hydraulic fluid from the hydraulic motor. A drain is disposed within the casing for permitting hydraulic fluid to drain from a portion of the casing containing the bores, rods, and joint of each pair of connected rods. The drain is preferably located in a portion of the casing above each joint of the connected pairs of rods.

BEST MODE FOR CARRYING OUT THE PRESENT INVENTION

Figure 1:
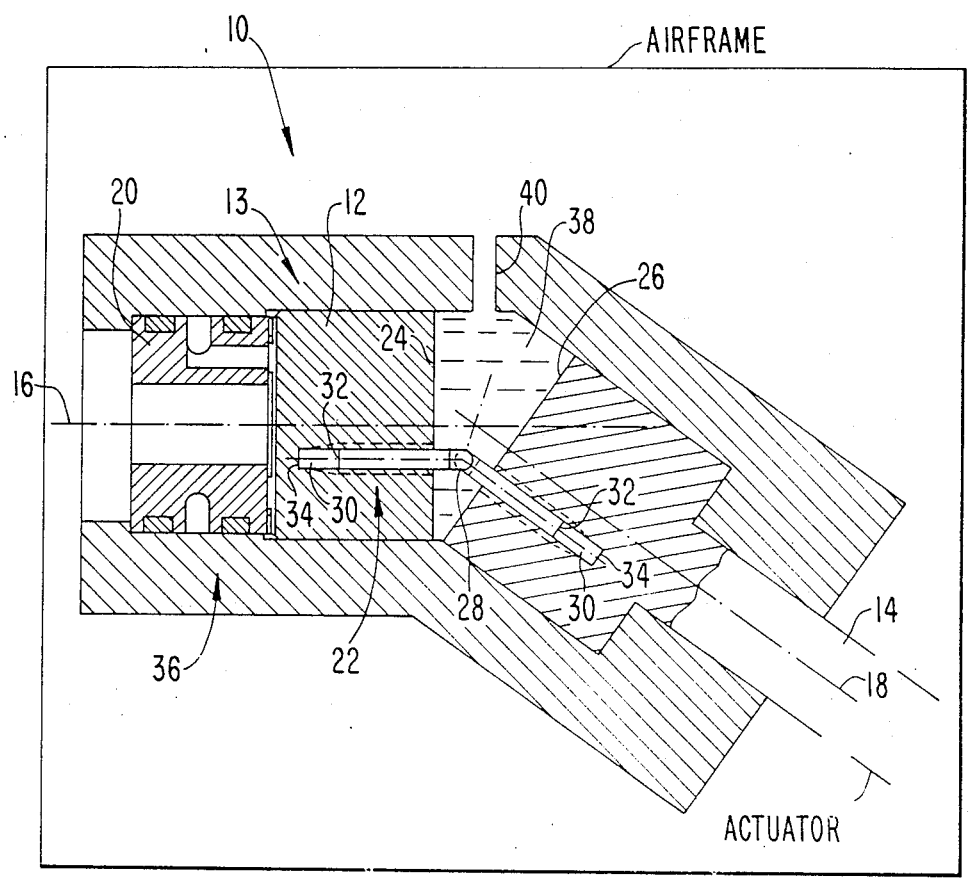
FIG. 1 illustrates a schematic view of a constant velocity joint in accordance with the present invention.

FIG. 1 illustrates a sectional view of an embodiment of a constant velocity rotary coupling 10 between members having inclined axis of rotation in accordance with the present invention. The terminology "member" is used herein to identify a rotationally. mounted structure such as but not limited to a shaft or cylinder block of a hydraulic motor. The constant velocity coupling 10 couples a driven member 12, which is preferably the cylinder block of a hydraulic motor 13 utilized in an actuator for an air frame, to an output member 14 which drives the actuator and preferably is a shaft. As illustrated the axis of rotation 16 of the driven member 12 is inclined to the axis of rotation 18 of the output member 14. The hydraulic motor 13 is of conventional construction and is not described in detail herein. Pressurized hydraulic fluid is supplied through port plate 20 to cause the cylinder block of the hydraulic motor 13 to rotate in a conventional fashion. At least one pair of pivotally connected rods 22 are disposed respectively within axial bores described below with reference to FIGS. 2 and 3 within the ends 24 and 26 respectively of the first driven and second output member 12 and 14 as illustrated in FIG. 1. Only a single pair of pivotally connected rods 22 is illustrated for purposes of not unduly complicating the illustration of the invention. However, it should be understood that preferably a plurality of pairs of connected rods 22 are disposed symmetrically about the axes of rotation 16 and 18 of the driven first member 12 and the second output member 14. A joint 28, having at least one degree of rotation of freedom, connects each pair of rods 22 together with only a single degree of rotation being necessary. Each bore has a space 30 which extend-s between the end of the rod 32 and the end of the bore 34. Casing 36 contains the hydraulic motor 13, the member 12 which is the cylinder block of the hydraulic motor 13, the pairs of rods 22 and joints 28, and at least a portion of the output member 14. Furthermore, it should be understood that the first driven member 12 may be a separate shaft which is attached to the cylinder block of the hydraulic motor instead of being integral therewith as illustrated in FIG. 1. Leakage fluid from the hydraulic motor 13 fills the cavity 38, which is in fluid communication with the portion of the casing 36 containing the bores 42, rods 22 and joints 28 and is above the joints 28 and supplies hydraulic fluid for lubricating the joints and pairs of rods 22 within the bores as described below. Drain 40 permits excess hydraulic fluid which collects in the cavity 38 to be drained overboard. Alternatively, the excess hydraulic fluid may be returned to a suitable sump (not illustrated).

Figure 4:
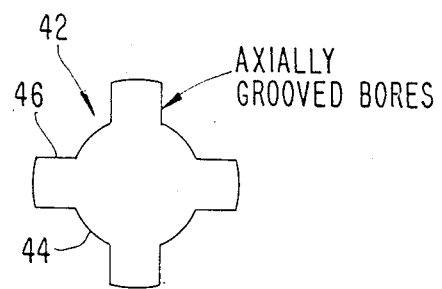
FIG. 4 illustrates an enlarged view of the individual bores within the ends of the members illustrated in FIGS. 2 and 3.
Figure 2:
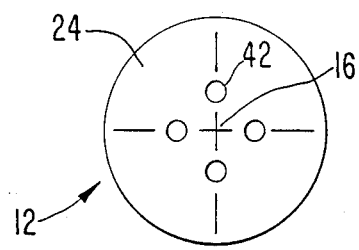
FIG. 2 illustrates an end view of a driven member illustrating bores for receiving rods of the constant velocity joint of the present invention.

FIG. 2 illustrates an end view of the first member 12. The plurality of bores 42, which receive the individual rods of the pairs of rods 22, are usually spaced around the axis of rotation 16. A plurality of channels (not illustrated), described below with reference to FIG. 4, are equally spaced around the periphery of each of the bores 42. It should be understood that any number of bores 42 may be utilized with the number of bores being chosen as a function of the torque and power to be transmitted between the first member 12 and the second member 14.

Figure 3:
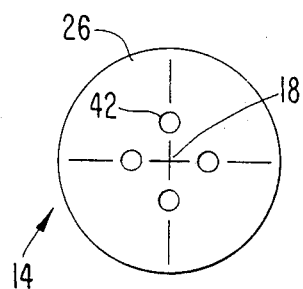
FIG. 3 illustrates an end view of an output member illustrating bores for receiving rods of the constant velocity joint of the present invention.

FIG. 3 illustrates an end view of the second member 14. Like reference numerals identify like parts in FIGS. 2 and 3. The spacing and pattern of the bores 42 with respect to the center line 18 in FIG. 3 is identical to the spacing and pattern of the bores with respect to the center line 16 in FIG. 2.

FIG. 4 illustrates an enlarged view of a single bore 42 within the ends of the members 12 and 14. The channels 46 in the periphery 44 of the bores 42 play an important part in lubricating the bores against wear caused by rotation of the members 12 and 14 which cause relative motion between the pairs of rods 22 in the bores, provide a mechanism of permitting fluid flow around the rods through the channels 46 for relieving pressure in hydraulic fluid which would be pumped by the movement of the ends 32 of the rods toward the bottom 34 of each of the bores and reduce drag which would be caused by a small clearance between the outside surface of the pairs of rods 22 and the periphery 44 of the bores.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A constant velocity joint rotationally connecting rotationally mounted first and second members together each having an axis of rotation comprising:
   at least one axial bore within the first member offset from and parallel to the axis of rotation of the first member;
   a plurality of channels extending along each axial bore of the first member which are located in a peripheral wall of each axial bore of the first member;
   at least one axial bore within the second member offset from and parallel to the axis of rotation of the second member;
   a plurality of channels extending along each axial bore of the second member which are located in a peripheral wall of each axial bore of the second member;
   at least one pair of rods connected together by a joint having at least one degree of rotational freedom, one of the rods of each pair of connected rods being disposed in an axial bore within the first member and another of the rods of each pair of connected rods being disposed in an axial bore within the second member;
   means for connecting the first member to a hydraulic motor;
   a casing means for containing at least a portion of the first and second members and for containing hydraulic fluid utilized by the hydraulic motor; and
   means for supplying leakage hydraulic fluid from the hydraulic motor for lubricating the joints and rods disposed within the axial bores during rotation of the first and second members.

2. A constant velocity joint in accordance with claim 1 wherein:
   each joint has only a single degree of rotational freedom.

3. A constant velocity joint in accordance with claim 1 wherein:
   each of the bores has an opening receiving a rod and an end opposed to the opening which closes the bore.

4. A constant velocity joint in accordance with claim 3 wherein:
   each joint has only a single degree of rotational freedom.

5. A constant velocity joint in accordance with claim 3 wherein:
   the channels of each of the bores of the members are displaced at equally spaced intervals about a peripheral wall of the bores.

6. A constant velocity joint in accordance with claim 5 wherein:
   each joint has only a single degree of rotational freedom.

7. A constant velocity joint as in claim 3 wherein:
   the second member is connected to an actuator; and
   the casing means further contains the hydraulic motor, the first member, the rods, the bores and each joint.

8. A constant velocity joint in accordance with claim 7 wherein:
   each joint has only a single degree of rotational freedom.

9. A constant velocity joint in accordance with claim 7 wherein:
   the channels of each of the bores of the members are displaced at equally spaced intervals about a peripheral wall of the bores.

10. A constant velocity joint in accordance with claim 9 wherein:
    each joint has only a single degree of rotational freedom.

11. A constant velocity joint in accordance with claim 7 wherein:
    the actuator is within an airframe.

12. A constant velocity joint in accordance with claim 11 wherein:
    each joint has only a single degree of rotational freedom.

13. A constant velocity joint in accordance with claim 11 wherein:
    the channels of each of the bores of the members are displaced at equally spaced intervals about a peripheral wall of the bores.

14. A constant velocity joint in accordance with claim 13 wherein:
    each joint has only a single degree of rotational freedom.

15. A constant velocity joint rotationally connecting rotationally mounted first and second members together each having an axis of rotation comprising:
    at least one axial bore within the first member offset from and parallel to the axis of rotation of the first member;
    a plurality of channels extending along each axial bore of the first member which are located in a peripheral wall of each axial bore of the first member;
    at least one axial bore within the second member offset from and parallel to the axis of rotation of the second member;
    a plurality of channels extending along each axial bore of the second member which are located in a peripheral wall of each axial bore of the second member;
    at least one pair of rods connected together by a joint having at least one degree of rotational freedom, one of the rods of each pair of connected rods being disposed in an axial bore within the first member and another of the rods of each pair of connected rods being disposed in an axial bore within the second member;
    a casing containing at least a portion of the first and second members and for containing a hydraulic fluid lubricating medium which is disposed within the bores and the channels during rotation of the first and second members;
    wherein each of the bores has an opening receiving a rod and an end opposed to the opening which closes the bore; and
    wherein the hydraulic fluid contained within the bores and the channels is leakage hydraulic fluid from a hydraulic motor connected to the first member.

16. A constant velocity joint rotationally connecting rotationally mounted first and second members together each having an axis rotation comprising:
    at least one axial bore within the first member offset from and parallel to the axis of rotation of the first member;

a plurality of channels extending along each axial bore of the first member which are located in a peripheral wall of each axial bore of the first member;

at least one axial bore within the second member offset from and parallel to the axis of rotation of the second member;

a plurality of channels extending along each axial bore of the second member which are located in a peripheral wall of each axial bore of the second member;

at least one pair of rods connected together by a joint having at least one degree of rotational freedom, one of the rods of each pair of connected rods being disposed at an axial bore with in the first member and another of the rods of each pair of connected rods being disposed at an axial bore within the second member;

a casing for containing at least a portion of the first and second members and for containing a hydraulic fluid lubricating medium which is disposed within the bores and the channels during rotation of the first and second members;

a drain within the casing for permitting the hydraulic fluid to drain from a portion of the casing in fluid communication with the bores, rods and joints of each pair of connected rods;

wherein each of the bores has an opening receiving a rod and an end opposed to the opening which closes the bore; and wherein the hydraulic fluid contained within the bores and the channels is leakage hydraulic fluid from a hydraulic motor connected to the first member.

17. A constant velocity joint in accordance with claim 16 wherein:

the drain is located in a portion of the casing so as to permit excess hydraulic fluid to drain from a cavity accommodating each joint of the connected pairs of rods.

* * * * *